(12) United States Patent
Hyun et al.

(10) Patent No.: US 9,880,701 B2
(45) Date of Patent: Jan. 30, 2018

(54) MOBILE TERMINAL AND CONTROLLING METHOD THEREOF

(71) Applicant: LG ELECTRONICS INC., Seoul (KR)

(72) Inventors: Juha Hyun, Seoul (KR); Sehyun Jung, Seoul (KR); Shinnyue Kang, Seoul (KR); Eunsoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 219 days.

(21) Appl. No.: 14/591,769

(22) Filed: Jan. 7, 2015

(65) Prior Publication Data

US 2015/0212692 A1 Jul. 30, 2015

(30) Foreign Application Priority Data

Jan. 28, 2014 (KR) ........................ 10-2014-0010855

(51) Int. Cl.
*G06F 3/048* (2013.01)
*G06F 3/0481* (2013.01)
*G06F 3/0488* (2013.01)

(52) U.S. Cl.
CPC ........ *G06F 3/04817* (2013.01); *G06F 3/0488* (2013.01)

(58) Field of Classification Search
CPC .. G06F 3/0482; G06F 3/0488; G06F 3/04817; G06F 3/04883; G06F 3/04886; G06F 3/04842; G06F 3/048
See application file for complete search history.

(56) References Cited

U.S. PATENT DOCUMENTS 7,834,861 B2 * 11/2010 Lee ........................ G06F 3/0482
345/173
9,112,988 B2 * 8/2015 Lee ..................... G06F 3/04817
(Continued)

FOREIGN PATENT DOCUMENTS

EP 2124138 11/2009
EP 2544079 1/2013

OTHER PUBLICATIONS

European Patent Office Application Serial No. 15150654.0, Search Report dated Jul. 15, 2015, 9 pages.

*Primary Examiner* — Linh K Pham
(74) *Attorney, Agent, or Firm* — Lee, Hong, Degerman, Kang & Waimey

(57) ABSTRACT

A mobile terminal and controlling method thereof are disclosed, which facilitates the use of a terminal in further consideration of user's convenience. The present invention includes a touchscreen configured to detect a direct touch and a proximity touch and a controller outputting at least one or more icons through the touchscreen, the controller detecting the proximity touch to a $1^{st}$ icon for running a prescribed application among the outputted at least one or more icons, the controller, if a duration time of the detected proximity touch reaches a $1^{st}$ time, outputting a $2^{nd}$ icon by changing the outputted $1^{st}$ icon into the $2^{nd}$ icon, the controller, if the direct touch to the $2^{nd}$ icon is detected, running a prescribed function of the prescribed application. Accordingly, it is able to access various functions of the mobile terminal using a proximity touch.

6 Claims, 19 Drawing Sheets

(56) References Cited

U.S. PATENT DOCUMENTS

| | | | |
|---|---|---|---|
| 9,292,199 B2* | 3/2016 | Choi | G06F 3/04883 |
| 9,563,347 B2* | 2/2017 | Yano | G06F 3/0488 |
| 2005/0091609 A1 | 4/2005 | Matthews et al. | |
| 2006/0095865 A1 | 5/2006 | Rostom | |
| 2008/0174570 A1* | 7/2008 | Jobs | G06F 3/0488 |
| | | | 345/173 |
| 2008/0295008 A1 | 11/2008 | Kujda et al. | |
| 2010/0058253 A1* | 3/2010 | Son | G06F 1/1616 |
| | | | 715/863 |
| 2010/0157157 A1 | 6/2010 | Yi | |
| 2011/0035691 A1* | 2/2011 | Kim | G06F 3/04817 |
| | | | 715/765 |
| 2012/0023462 A1* | 1/2012 | Rosing | G06F 3/0483 |
| | | | 715/863 |
| 2012/0120002 A1 | 5/2012 | Ota | |
| 2012/0262398 A1* | 10/2012 | Kim | G06F 3/041 |
| | | | 345/173 |
| 2013/0169549 A1* | 7/2013 | Seymour | G06F 3/0488 |
| | | | 345/173 |
| 2014/0160045 A1* | 6/2014 | Park | G06F 3/0488 |
| | | | 345/173 |
| 2016/0004416 A1* | 1/2016 | Kim | H04M 1/72563 |
| | | | 715/769 |

* cited by examiner

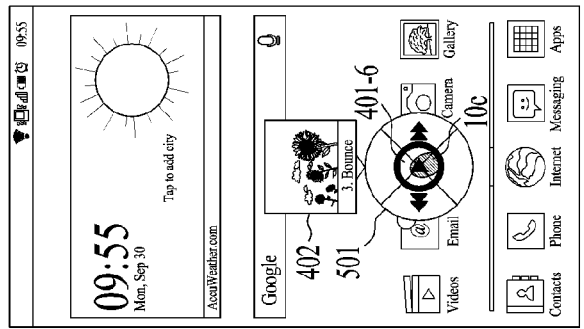
FIG. 5D
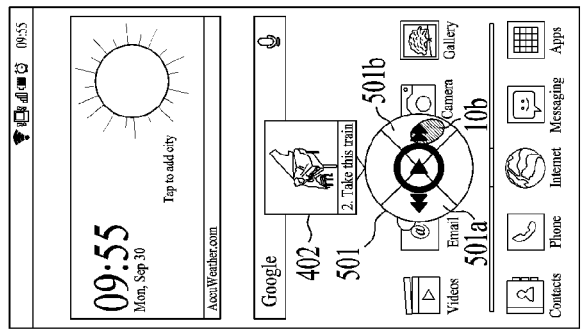
FIG. 5C
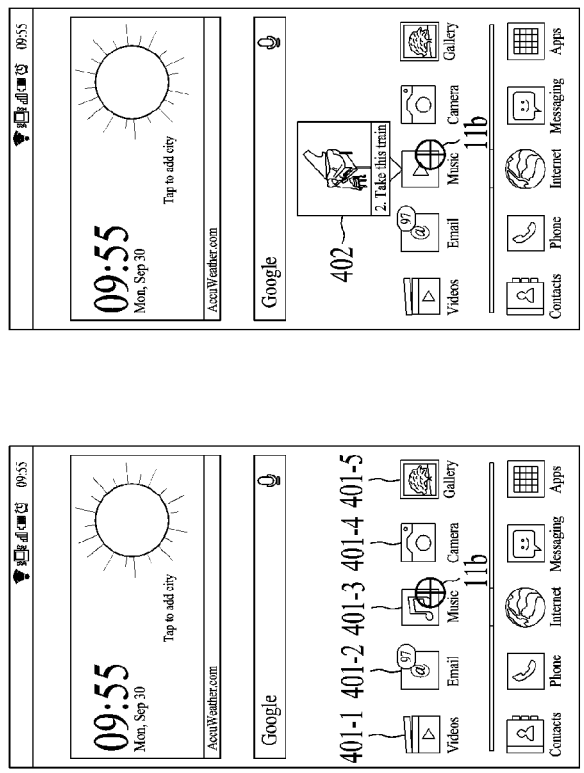
FIG. 5B
FIG. 5A

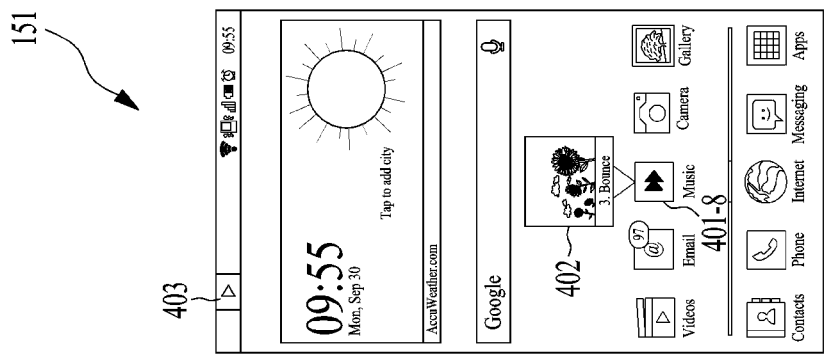
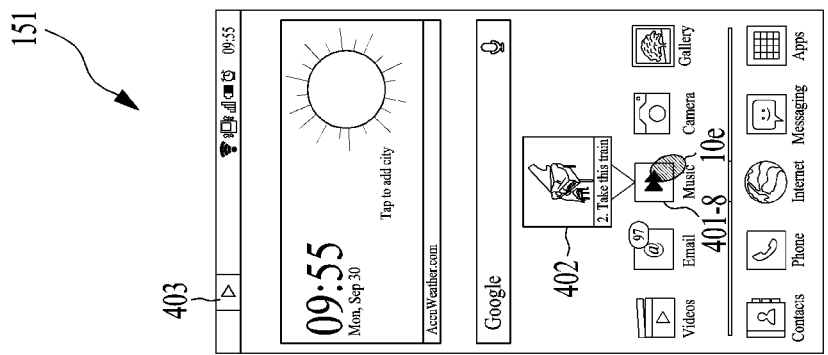
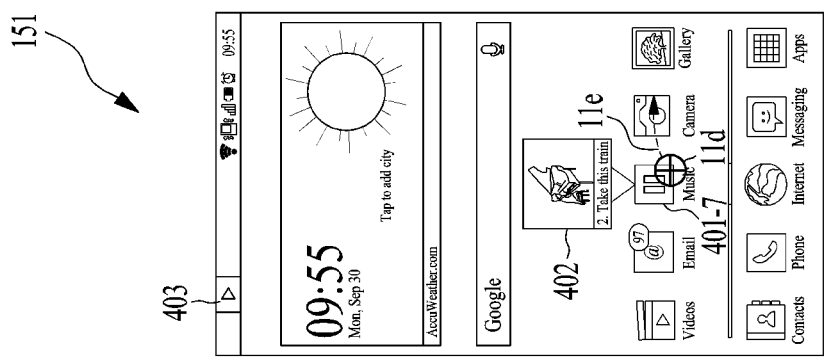

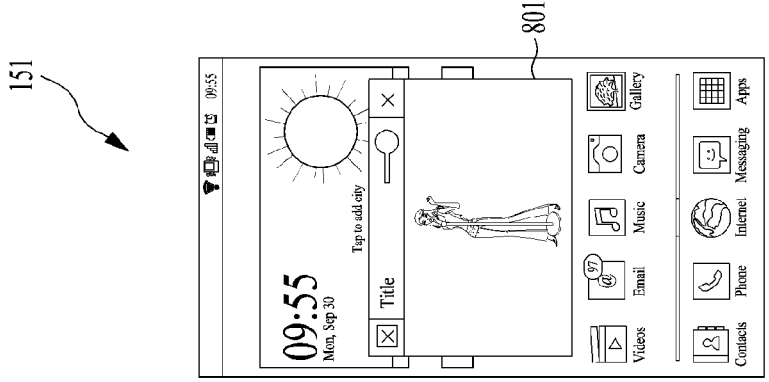
FIG. 8A  FIG. 8B
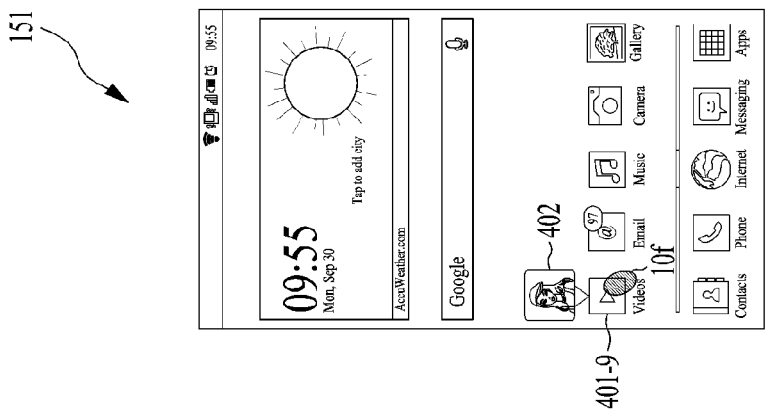
FIG. 8C  FIG. 8D
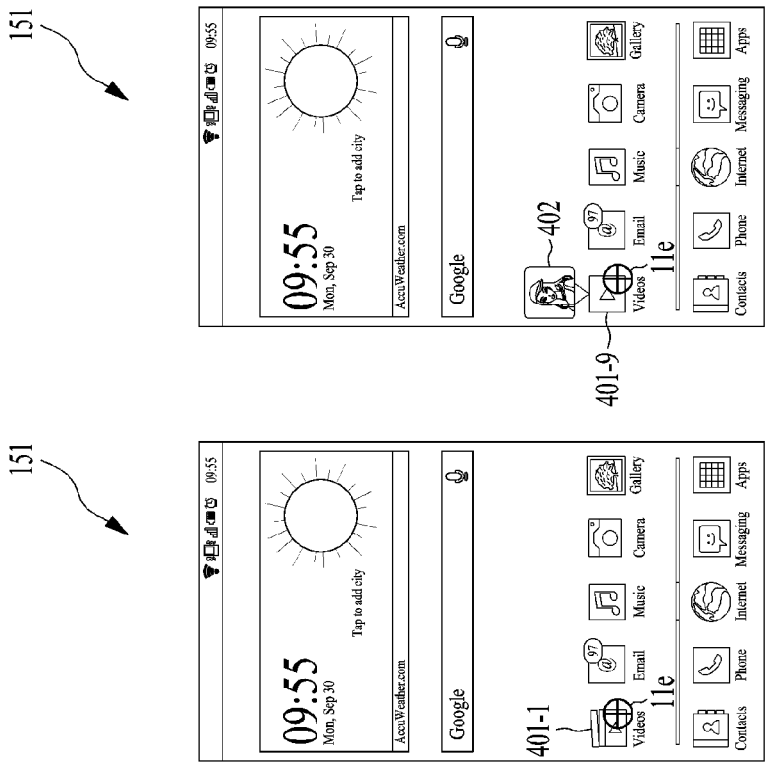

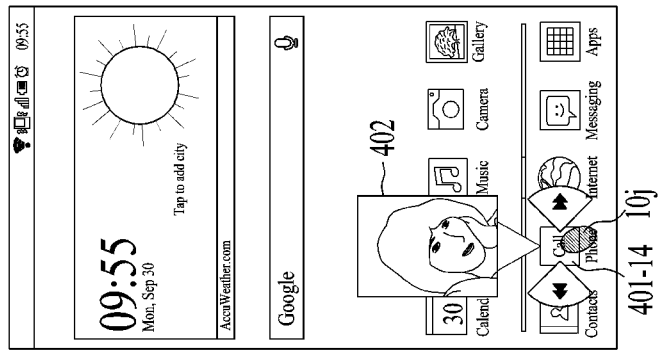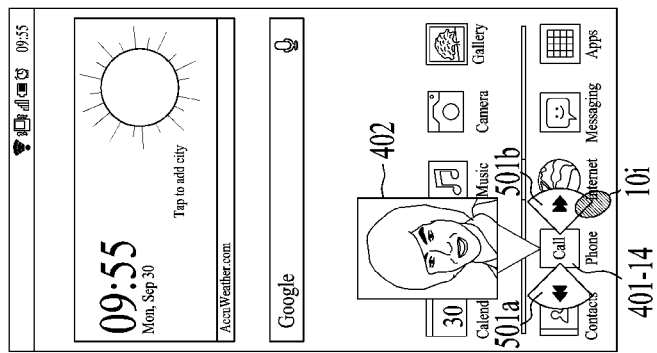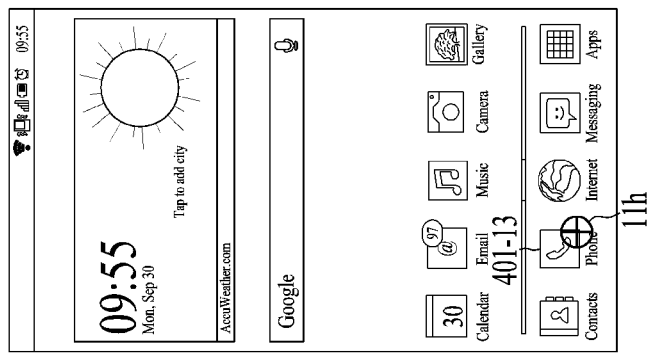

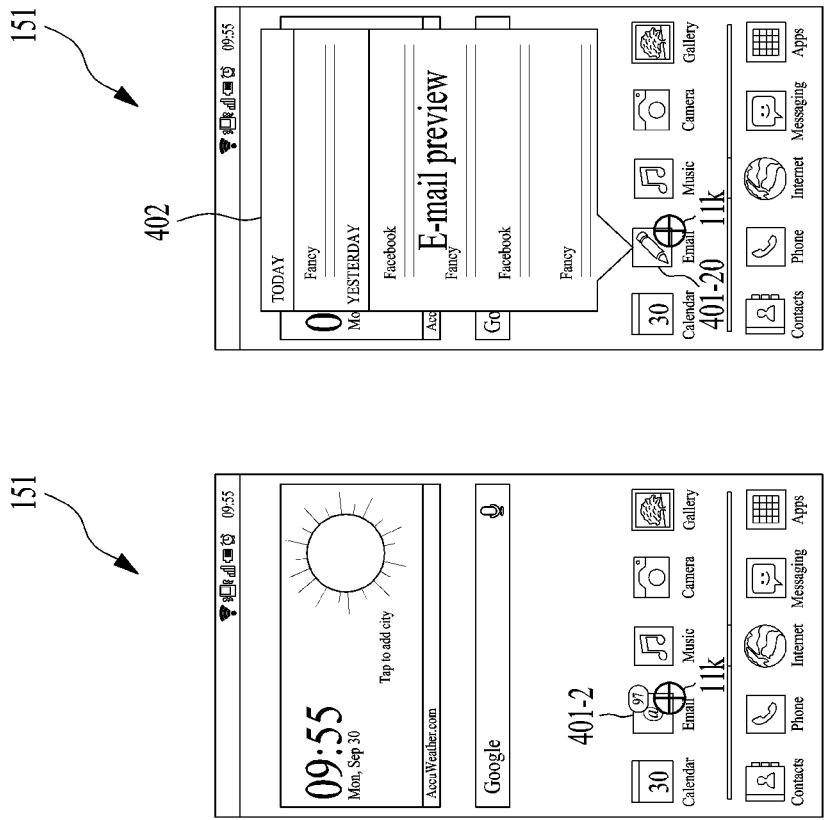

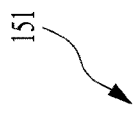
FIG. 16A
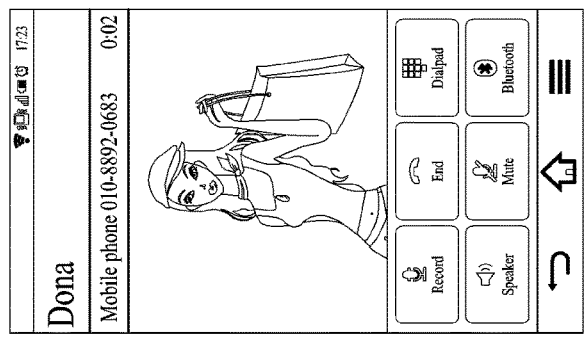
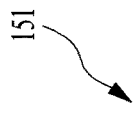
FIG. 16B
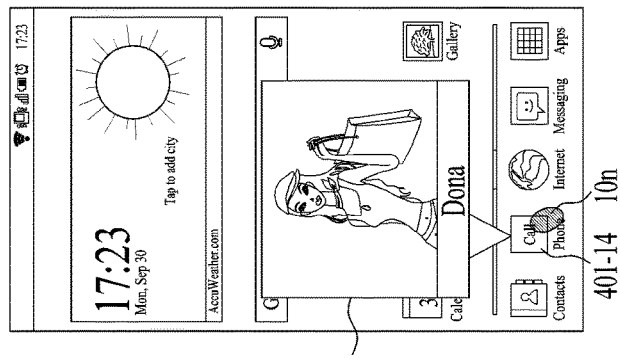
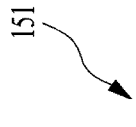
FIG. 16C
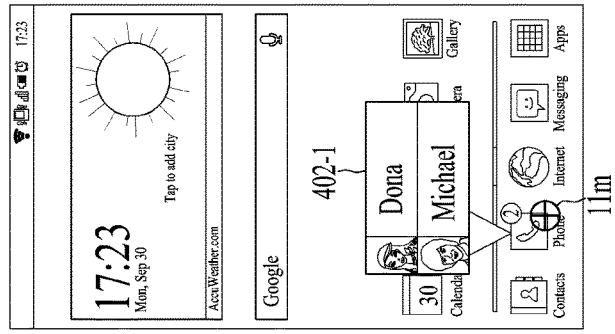
FIG. 16D
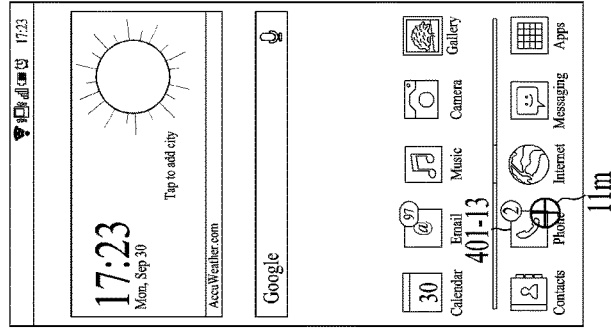

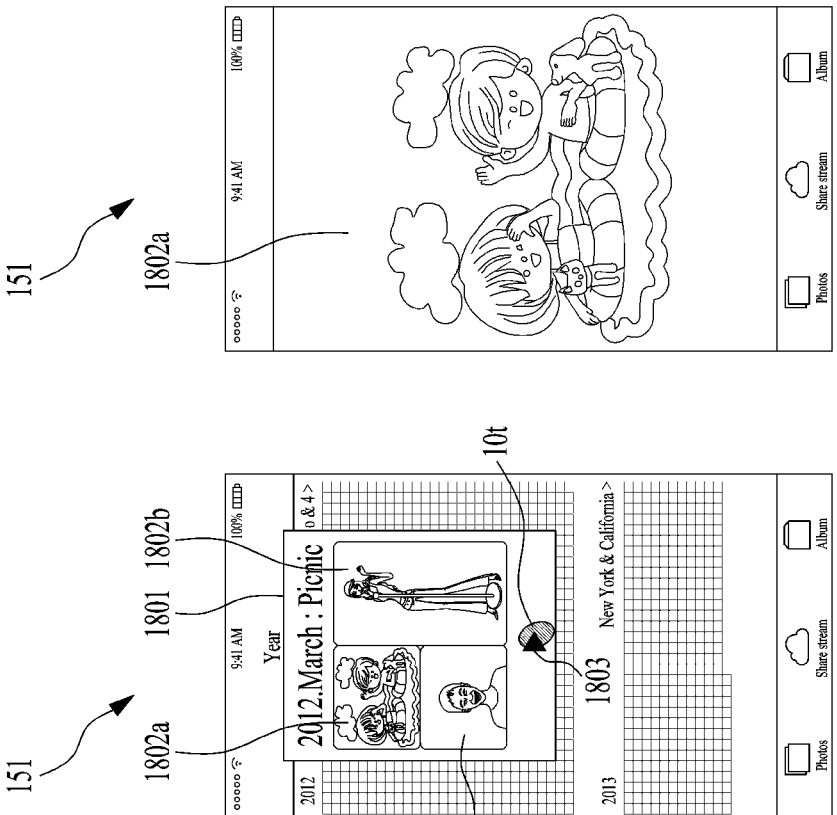
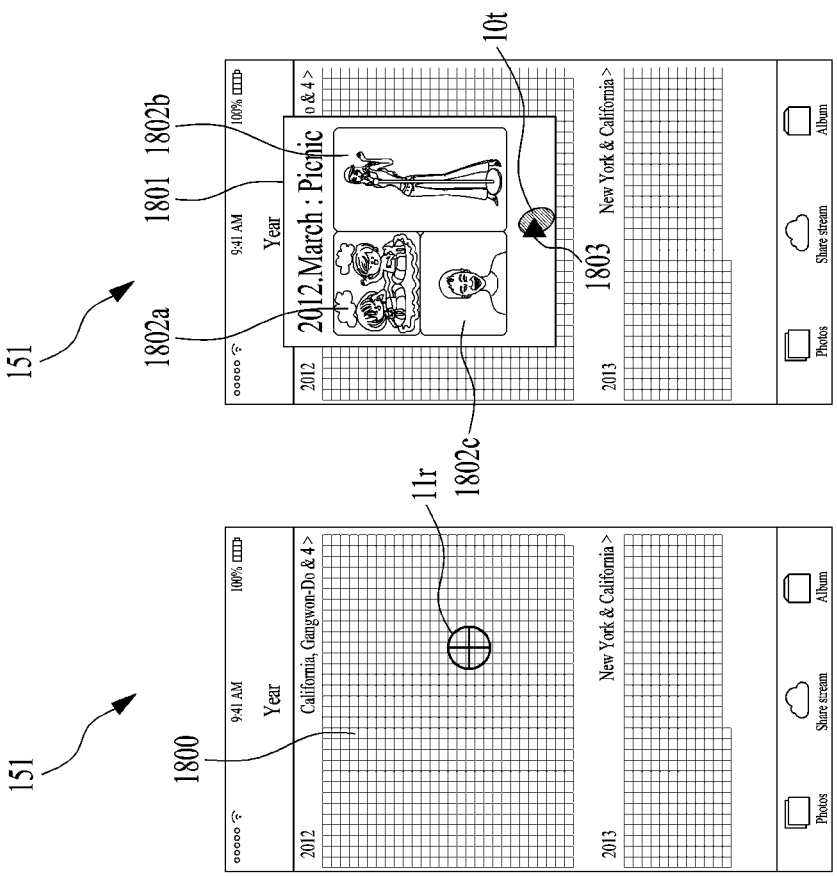

MOBILE TERMINAL AND CONTROLLING METHOD THEREOF

Pursuant to 35 U.S.C. §119(a), this application claims the benefit of earlier filing date and right of priority to Korean Application No. 10-2014-0010855, filed on Jan. 28, 2014, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for facilitating the use of a terminal in further consideration of user's convenience.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A mobile terminal is equipped with a controlling method for providing a user with a more convenient and intuitive use method using various sensors. Particularly, as a touchscreen is equipped with both an input means and an output means simultaneously, it can remarkably enhance utilization/intuitiveness of a user's controlling method. Recently, regarding the input means of the touchscreen, a touch input having a prescribed spaced distance from the touchscreen (i.e., a proximity touch input) tends to be introduced as well as an input of a direct touch to the touchscreen.

In order to meet the above tendency, the demand for a more effective mobile terminal controlling method using a proximity tendency is increasingly rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a more convenient controlling method can be provided based on a detection of a proximity touch received through a touchscreen.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen configured to detect a direct touch and a proximity touch and a controller outputting at least one or more icons through the touchscreen, the controller detecting the proximity touch to a $1^{st}$ icon for running a prescribed application among the outputted at least one or more icons, the controller, if a duration time of the detected proximity touch reaches a $1^{st}$ time, outputting a $2^{nd}$ icon by changing the outputted $1^{st}$ icon into the $2^{nd}$ icon, the controller, if the direct touch to the $2^{nd}$ icon is detected, running a prescribed function of the prescribed application.

Preferably, the prescribed application may include an audio play application and the prescribed function may include a function of playing an audio content set as a current play item.

More preferably, in playing the audio content, the controller may play the audio content without outputting a running application of the audio play application.

More preferably, if the duration time of the detected proximity touch reaches the $1^{st}$ time, the controller may further output an image corresponding to the audio content set as the current play item.

More preferably, if the duration time of the detected proximity touch reaches a $2^{nd}$ time, the controller may further output at least one function run icon for controlling an operation of the prescribed application.

And, the at least one function run icon may include an icon for changing the audio content into either a previous order content or a next order content.

More preferably, if the duration time of the detected proximity touch reaches the $1^{st}$ time and a drag in a prescribed distance is applied in a prescribed direction by maintaining the proximity touch, the controller may further output a $3^{rd}$ icon corresponding to the prescribed direction. In this case, the $3^{rd}$ icon may include an icon for changing the audio content into either a previous order content or a next order content.

And, if the prescribed direction is a right direction, the $3^{rd}$ icon may include the icon for changing the audio content into the next order content. Moreover, if the prescribed direction is a left direction, the $3^{rd}$ icon may include the icon for changing the audio content into the previous order content.

Preferably, the prescribed application may include a video play application and the prescribed function may include a function of playing a video content set as a current play item.

More preferably, in playing the video content, the controller may output a play screen of the video content through a popup window displayed on the touchscreen.

In another aspect of the present invention, as embodied and broadly described herein, a method of controlling a mobile terminal according to the present invention may include the steps of outputting at least one or more icons through a touchscreen configured to detect a direct touch and a proximity touch in the mobile terminal, detecting the proximity touch to a $1^{st}$ icon for running a prescribed application among the outputted at least one or more icons, if a duration time of the detected proximity touch reaches a $1^{st}$ time, outputting a $2^{nd}$ icon by changing the outputted $1^{st}$ icon into the $2^{nd}$ icon, and if the direct touch to the $2^{nd}$ icon is detected, running a prescribed function of the prescribed application.

Preferably, the prescribed application may include an audio play application and the prescribed function may include a function of playing an audio content set as a current play item.

More preferably, the prescribed function running step may include the step of playing the audio content without outputting a running application of the audio play application.

More preferably, the method may further include the step of if the duration time of the detected proximity touch reaches the $1^{st}$ time, further outputting an image corresponding to the audio content set as the current play item.

More preferably, the method may further include the step of if the duration time of the detected proximity touch reaches a $2^{nd}$ time, further outputting at least one function run icon for controlling an operation of the prescribed application.

And, the at least one function run icon may include an icon for changing the audio content into either a previous order content or a next order content.

More preferably, the method may further include the step of if the duration time of the detected proximity touch reaches the $1^{st}$ time and a drag in a prescribed distance is applied in a prescribed direction by maintaining the proximity touch, further outputting a $3^{rd}$ icon corresponding to the prescribed direction. In this case, the $3^{rd}$ icon may include an icon for changing the audio content into either a previous order content or a next order content.

And, if the prescribed direction is a right direction, the $3^{rd}$ icon may include the icon for changing the audio content into the next order content. Moreover, if the prescribed direction is a left direction, the $3^{rd}$ icon may include the icon for changing the audio content into the previous order content.

Preferably, the prescribed application may include a video play application and the prescribed function may include a function of playing a video content set as a current play item.

More preferably, the prescribed function running step may include the step of outputting a play screen of the video content through a popup window displayed on the touchscreen.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5A, 5B, 5C and 5D are diagrams for a controlling method of further outputting an additional function icon after a lapse of a duration time of a proximity touch input according to one embodiment of the present invention;

FIGS. 7A, 7B and 7C are diagrams for a controlling method of changing an icon through a swipe action of a proximity touch input according to one embodiment of the present invention;

FIGS. 8A, 8B, 8C and 8D are diagrams for one example of applying a controlling method of changing an icon using a proximity touch to 'video play application' according to one embodiment of the present invention;

FIGS. 12A, 12B and 12C are diagrams for a controlling method of running a prescribed function of a call application using a proximity touch according to one embodiment of the present invention;

FIGS. 15A, 15B, 16A, 16B, 16C and 16D are diagrams for a controlling method of providing a preview of an alarm in response to a proximity touch input received on an application having the alarm exist therein to be provided to a user according to one embodiment of the present invention;

FIGS. 18A, 18B and 18C are diagrams for a controlling method of facilitating a photo reading using a proximity touch according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the description only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, it is apparent to those skilled in the art that a configuration according to an embodiment disclosed in this specification is applicable to such a fixed terminal as a digital TV, a desktop computer and the like as well as a mobile terminal.

Figure 1A:
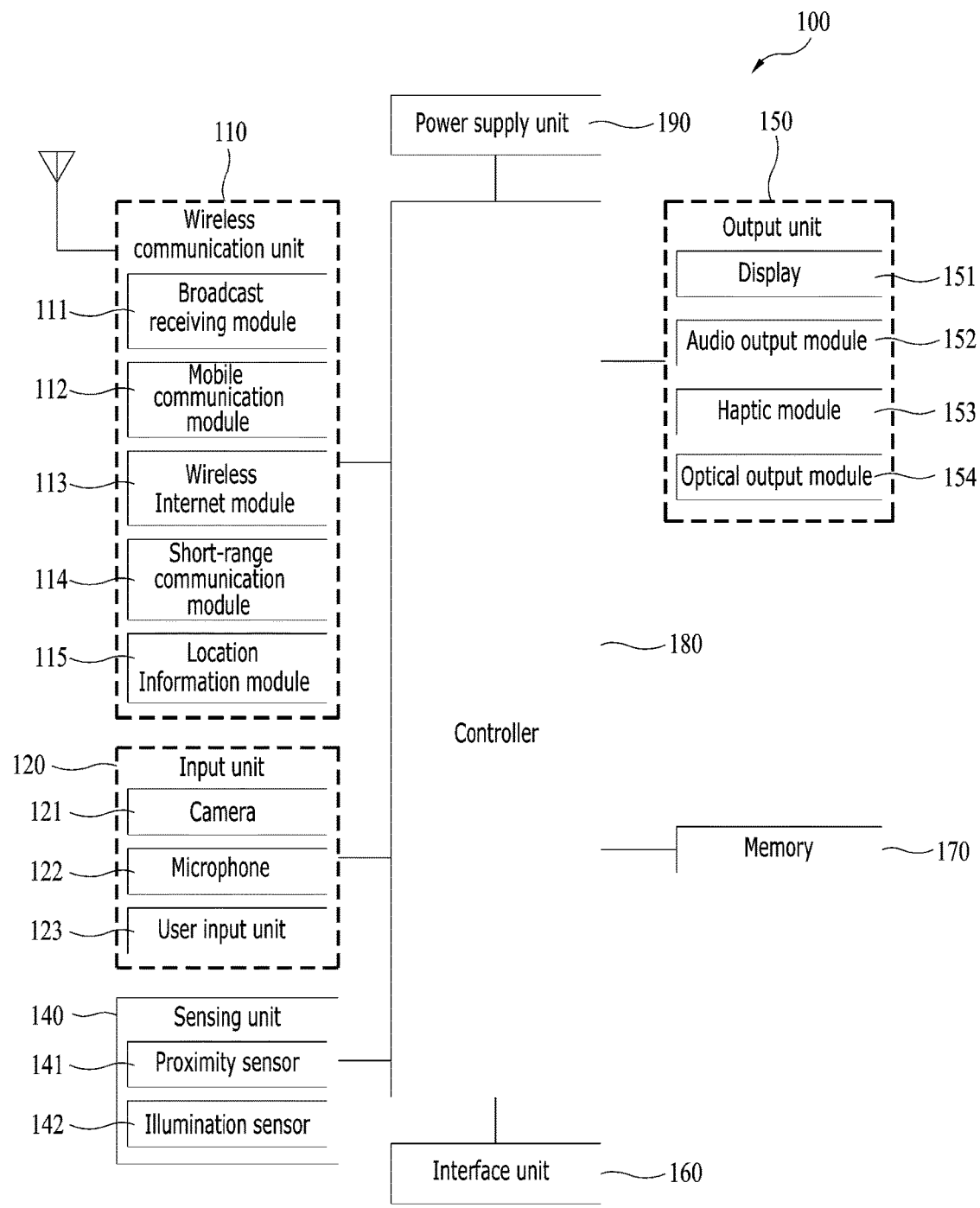
FIG. 1A is a block diagram illustrating a mobile terminal according to one embodiment of the present invention.

FIG. 1A is a block diagram of a mobile terminal 100 in accordance with an embodiment of the present invention. FIG. 1A shows the mobile terminal 100 includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1A shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-information module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1A, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 for a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button provided to front/rear/lateral side of the mobile terminal 100 and a touch sensor (constant pressure/electrostatic) and may further include a key pad, a dome switch, a jog wheel, a jog switch and the like.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

When the display 151 and the touch sensor configures a mutual layer structure (hereinafter called 'touch screen'), the display 151 can be used as an input device as well as an output device. In this instance, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, the touch sensor can be configured to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 1B:
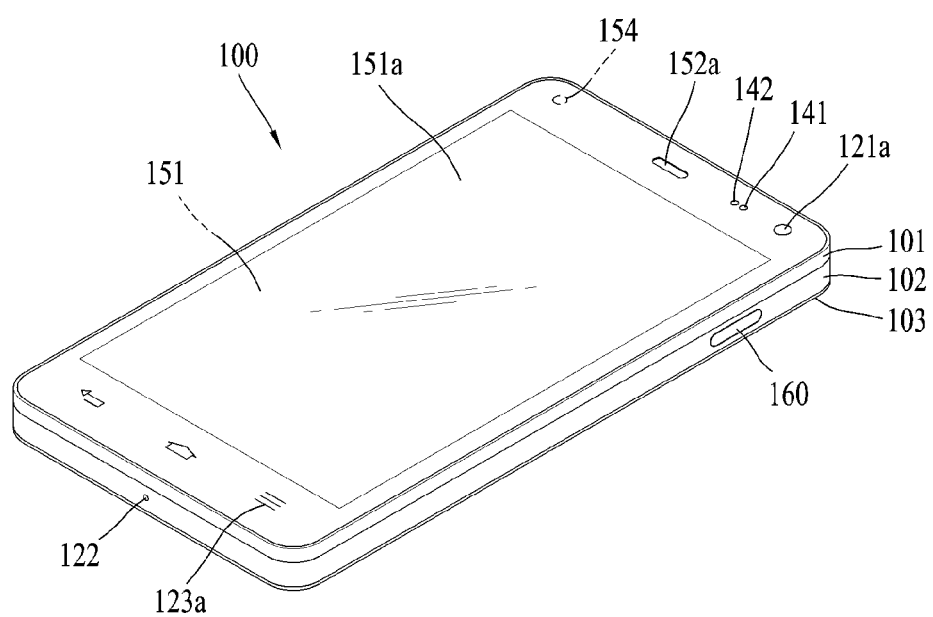
FIGS. 1B and 1C are front and rear perspective diagrams of a mobile terminal according to one embodiment of the present invention.

Referring to FIG. 1B, the proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor 141 has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm 153 is output a signal for announcing the occurrence of a particular event associated with the mobile terminal 100. Typical events include a call received event, a message received event and a touch input received event. The alarm 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

A projector module 155 can also be included for projecting images stored in the memory 160, externally received etc. The projector module 155 can also be rotated so as to project images in different directions.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output for a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component. Moreover, the controller 180 can perform a pattern (or image) recognizing process for recognizing a writing input and a picture drawing input performed on the touchscreen as characters or images, respectively.

The power supply 190 provides power required by the various components for the mobile terminal 100. The power may be internal power, external power, or combinations thereof. A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 1B is a front perspective diagram of a mobile terminal according to one embodiment of the present invention. The mobile terminal 100 shown in the drawing has a bar type terminal body, however, the mobile terminal 100 may be implemented in a variety of different configurations. Examples of such configurations include folder-type, slide-type, rotational-type, swing-type and combinations thereof. For clarity, the following description will primarily relate to a bar-type mobile terminal 100. However such teachings apply equally to other types of mobile terminals.

Referring to FIG. 1B, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Electronic components can be mounted on a surface of the rear case 102. The electronic part mounted on the surface of the rear case 102 may include such a detachable part as a battery, a USIM card, a memory card and the like. Thus, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Figure 1C:
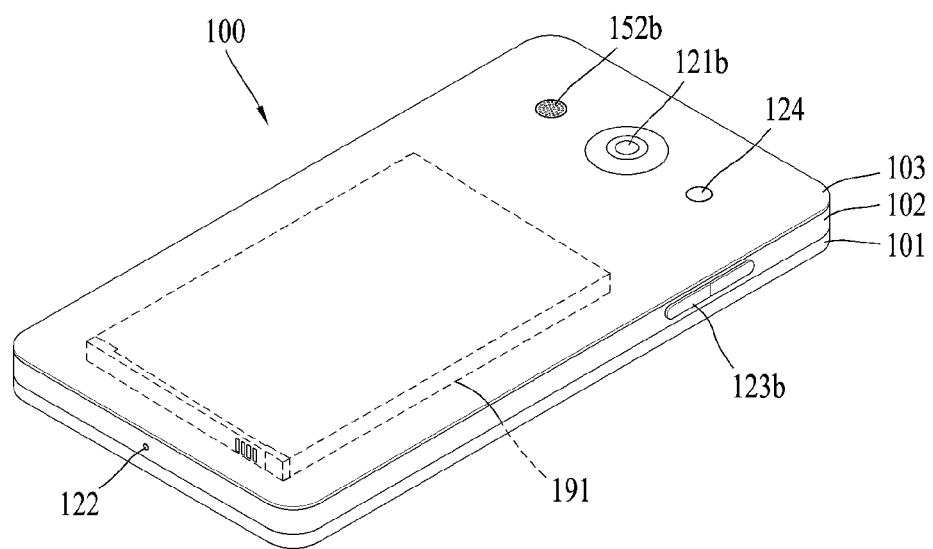

Referring to FIGS. 1B and 1C, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening configured to expose a camera 121' or an audio output unit 152' externally. The cases 101, 102 and 103 are formed by injection molding of synthetic resin or can be formed of metal substance such as stainless steel (STS), titanium (Ti) or the like for example.

A display 151, an audio output unit 152, a camera 121, user input units 130 (131, 132 and 133), a microphone 122, an interface 180 and the like can be provided to the case 101 or 102. The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131, 132 and 133. The manipulating units 131, 132 and 133 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152 and the like can be input to the second manipulating unit 132, a command for a switching to a touch recognizing mode of the display 151 and the like can be input to the manipulating unit 133.

Figure 3:
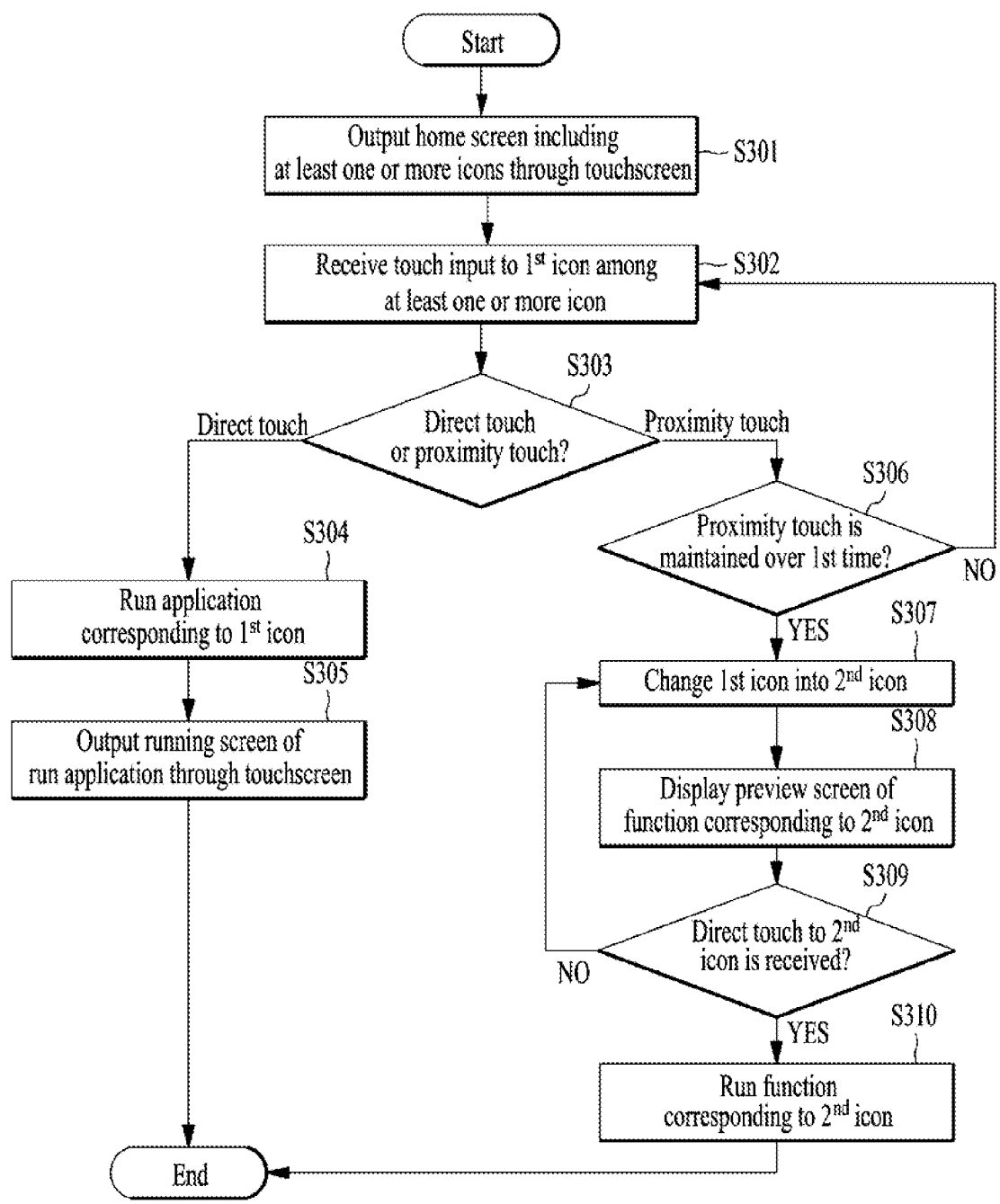
FIG. 3 is a flowchart of a controlling method of changing an icon in response to a proximity touch according to one embodiment of the present invention.

FIG. 1C is a perspective diagram of a backside of the terminal shown in FIG. 3. Referring to FIG. 3, a camera 121' can be additionally provided to a backside of the terminal body, and more particularly, to the rear case 102. The camera 121' has a photographing direction that is substantially opposite to that of the camera 121 shown in FIG. 1B and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view their face reflected by the mirror 124.

An additional audio output unit 152' can be provided to the backside of the terminal body. The additional audio output unit 152' can implement a stereo function together with the former audio output unit 152 shown in FIG. 1B and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1A can be retractably provided to the terminal body.

According to one embodiment of the present invention, it is intended to provide a more convenient mobile terminal controlling method using a proximity touch. In particular, after a direct touch or a proximity touch applied to an icon outputted through a mobile terminal has been distinguished, it is proposed to facilitate an access to one of various functions using the distinguished touch.

The difference between of the direct touch and the proximity touch is described in detail with reference to FIG. 2A through FIG. 2D as follows.

FIG. 2A through FIG. 2D are diagrams for input methods of direct and proximity touches distinguished from each other according to one embodiment of the present invention.

Figure 2A:
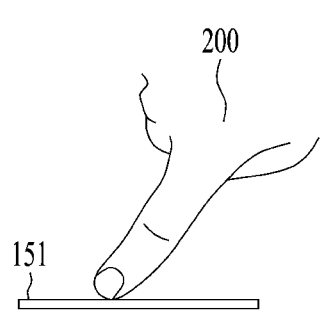
FIGS. 2A, 2B, 2C and 2D are diagrams for input methods of direct and proximity touches distinguished from each other according to one embodiment of the present invention.
Figure 2B:
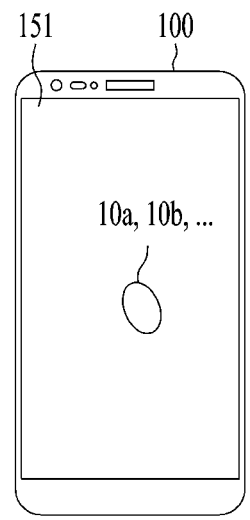

FIG. 2A shows a direct touch to a touchscreen 151 with a user's hand 200. Referring to FIG. 2A, the direct touch means a touch of coming in contact with the touchscreen 151. In the following description of one embodiment of the present invention with reference to the accompanying drawings, a direct touch shall be denoted by a shaded oval like FIG. 2B and reference numbers 10a, 10b . . . shall be used to refer to the direct touches, respectively.

Figure 2C:
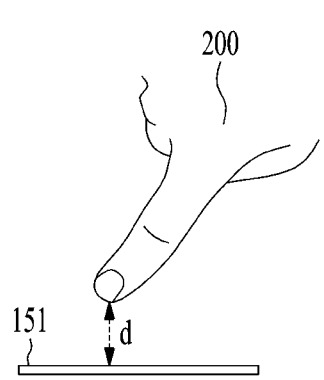
Figure 2D:
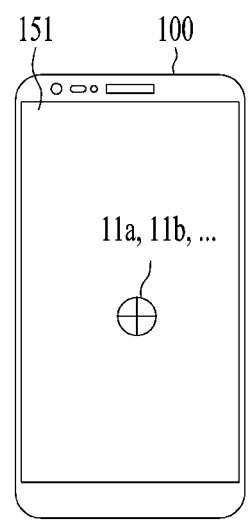

FIG. 2C shows a proximity touch to a touchscreen 151 with a user's hand 200. Referring to FIG. 2C, although a proximity touch fails to come in contact with the touchscreen 151, it means an input applied in a manner that a distance from the touchscreen 151 in a range of a prescribed distance d is proximate to a touch object (e.g., the user's hand 200). In the following description of one embodiment of the present invention with reference to the accompanying drawings, a proximity touch shall be denoted by a crossed circle like FIG. 2D and reference numbers 11a, 11b . . . shall be used to refer to the proximity touches, respectively.

In the following description, methods according to embodiments of the present invention are explained in detail with reference to the accompanying drawings.

Figure 4A:
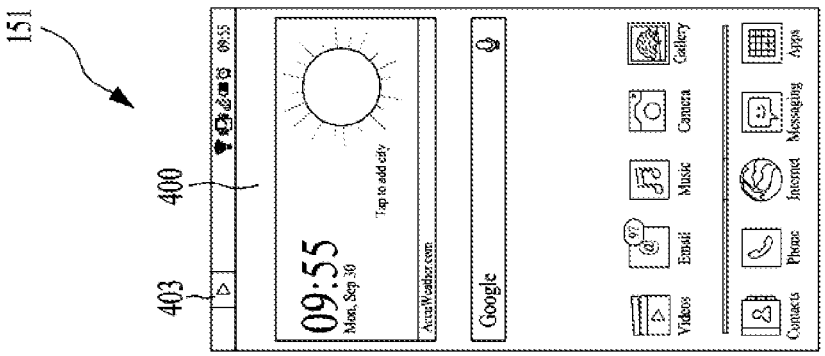
FIGS. 4A, 4B and 4C are diagrams for a configuration of a controlling method of changing an icon in response to a proximity touch according to one embodiment of the present invention.
Figure 4B:
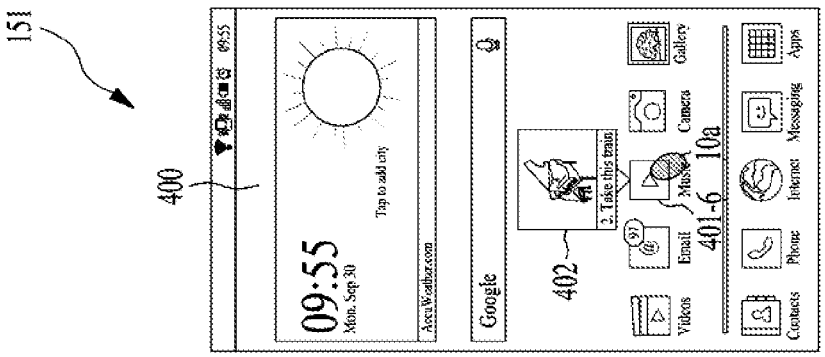
Figure 4C:
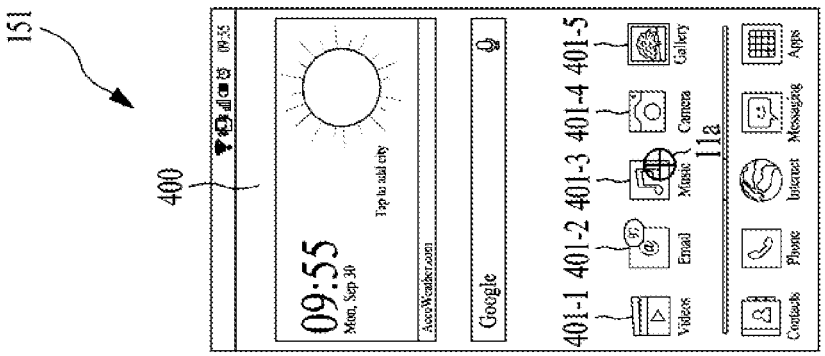

FIG. 3 is a flowchart of a controlling method of changing an icon in response to a proximity touch according to one embodiment of the present invention. And, FIGS. 4A, 4B and 4C are diagrams for a configuration of a controlling method of changing an icon in response to a proximity touch according to one embodiment of the present invention. Such a controlling method shall be described in detail with reference to FIG. 3 and FIG. 4A through FIG. 4C as follows.

Referring to FIG. 3 and FIG. 4A through FIG. 4C, in a step S301, the controller 180 outputs a home screen 400 including at least one or more icons 401-1 to 401-5 through the touchscreen 151. The home screen 400 is described in detail as follows.

First of all, when the touchscreen 151 is unlocked, the home screen 400 can be generally defined as a screen displayed on the touchscreen 151 initially. And, at least one icon or widget for running an application or an internal function may be displayed on the home screen 400. Optionally, at least two home screens 400 may exist in the mobile terminal 100. In this case, when a prescribed touch gesture is applied to the touchscreen 151, the at least two home screens 400 can be sequentially displayed one by one. And, different icons (or widgets) may be deployed on the at least two home screens 400, respectively.

In a step S302, the controller 180 receives a touch input to a $1^{st}$ icon (e.g., the icon 401-3 in the example shown in FIG. 4A through FIG. 4C) among the outputted at least one or more icons 401-1 to 401-5. Subsequently, in a step S303, the controller 180 determines whether the received touch input corresponds to a direct touch input or a proximity touch input.

If the controller 180 determines that the received touch input corresponds to the direct touch input in the step S303, the controller 180 runs an application corresponding to the $1^{st}$ icon [S304] and is able to output a running screen of the run application through the touchscreen 151 [S305].

If the controller 180 determines that the received touch input corresponds to the proximity touch input 11a in the step S303 [FIG. 4A], the controller 180 may go to a step S306. In the step S306, the controller 180 determines whether a duration time of the received proximity touch input 11a is equal to or greater than a $1^{st}$ time. If the proximity touch input is not applied over the $1^{st}$ time, the controller 180 can go back to the step S302. If the duration time of the proximity touch input 11a reaches the $1^{st}$ time, the controller 180 can go to a step S307.

In the step S307, referring to FIG. 4B, the controller 180 changes the $1^{st}$ icon 401-3 into a $2^{nd}$ icon 401-6. Subsequently, in a step S308, the controller 180 displays a preview screen 402 of a function corresponding to the $2^{nd}$ icon 401-6 on the touchscreen 151.

In a step S309, referring to FIG. 4B, the controller 180 determines whether a direct touch input 10a to the $2^{nd}$ icon 401-6 is received. If the direct touch input 10a to the $2^{nd}$ icon 401-6 is not received, the controller 180 can go back to the step S307. If the direct touch input 10a to the $2^{nd}$ icon 401-6 is received, the controller 180 can go to a step S310. In the step S310, the controller 180 can run a function of an application corresponding to the $2^{nd}$ icon 401-6.

Meanwhile, according to one embodiment of the present invention, the function of the application run in the step S310 is proposed as a function associated with the $1^{st}$ icon. In particular, if the $1^{st}$ icon is just the icon for running a prescribed application and outputting a running screen thereof, the $2^{nd}$ icon is set to the icon (i.e., a function icon) for executing a specific function of the prescribed application. For instance, if the $1^{st}$ icon is an icon for running an audio play application, as shown in FIG. 4A through FIG. 4C, it is proposed to set the $2^{nd}$ icon to a function icon for running a play function of the audio play application. If a plurality of audio contents are playable, when a prescribed audio content is played, the played audio content may include one of a content preset by a user, an audio content randomly selected from a plurality of the audio contents, and a most recently played audio content.

Moreover, the preview screen 402 may include a screen for outputting an image corresponding to the played audio content. In particular, the controller 180 outputs the preview screen 402 for a content played by the play function, thereby guiding a user with information on the played content.

According to one embodiment of the present invention, by the above-described controlling method (i.e., proximity touch detection), a controlling method of facilitating a user's access to each function of a specific application is available.

Referring to FIG. 4B, if a direct touch input 10a is applied to the $2^{nd}$ icon 401-6, the controller 180 can perform a play function of an audio play application.

According to one embodiment of the present invention, in performing the play function of the audio application, it is proposed not to output a running screen of the audio play application. Generally, if a specific application is run, it may be in general that a running screen of the run application is outputted and provided to a user. Yet, since the object of one embodiment of the present invention is to run a prescribed function of an application only with a simple manipulation, it is proposed not to output a running screen. Hence, referring to FIG. 4B, the play function is performed by the direct touch input 10a only but a running screen of an application is not outputted.

Detailed examples for an embodiment of the present invention may additionally consider the following cases.

(1) If a $1^{st}$ icon is a run icon of a video play application, a $2^{nd}$ icon may include an icon for performing a play function of the video play application.

(2) If a $1^{st}$ icon is a run icon of a call application, a $2^{nd}$ icon may include an icon for performing a call sending function of the call application. In this case, a counterpart of the call sending may include a most recently called counterpart.

(3) If a $1^{st}$ icon is a run icon of a contact search application, a $2^{nd}$ icon may include an icon for performing a contact information reading function of the contact search application. And, a specific contact of the contact information reading function may include a most recently searched contact.

(4) If a $1^{st}$ icon is a run icon of a gallery application, a $2^{nd}$ icon may include an icon for performing an image reading function of the gallery application. And, a target image of the image reading function may include a most recently read image.

According to the embodiment described so far, explained is a case that a duration time of a proximity touch reaches a $1^{st}$ time. According to one embodiment of the present invention, further proposed is an additional operation for a case that a $2^{nd}$ time longer than the $1^{st}$ time is reached. Such an embodiment is described in detail with reference to FIG. 5A through FIG. 5D as follows.

FIGS. 5A, 5B, 5C and 5D are diagrams for a controlling method of further outputting an additional function icon after a lapse of a duration time of a proximity touch input according to one embodiment of the present invention.

Referring to FIG. 5A, the controller 180 currently outputs at least one or more icons 401-1 to 401-5. And, a proximity touch input 11b is currently applied to the $1^{st}$ icon 401-3.

If a duration time of the proximity touch input 11b reaches a $1^{st}$ time, as mentioned in the foregoing description, the controller 180 is able to change the $1^{st}$ icon 401-3 into a $2^{nd}$ icon 401-6. And, as mentioned in the foregoing description, the controller 180 can output a preview screen 402.

If the duration time of the proximity touch input 11b reaches a $2^{nd}$ time, the controller 180 can further output at least one or more function icons 501a and 501b for controlling operations of a prescribed application. In this case, like the $2^{nd}$ icon 401-6, each of the function icons may include an icon for performing a function of an application that can be run through the $1^{st}$ icon. According to the example shown in FIG. 5C, the function icon 501a may execute a function of changing a content of a current play item into a previous order content and the function icon 501b may execute a function of changing a content of a current play item into a next order content.

Referring to FIG. 5C, if an input of selecting the function icon 501b is received, the controller 180 may be able to change a current play item into a next play item. Looking into a preview screen 402 shown in FIG. 5C, an image corresponding to a $1^{st}$ audio content '2. Take this train' is currently outputted. Looking into a preview screen 402 changed into a next play item, it can be observed that an image corresponding to a $2^{nd}$ audio content '3. Bounce' is currently outputted.

Referring to FIG. 5D, if a direct touch input 10c is applied to the $2^{nd}$ icon 401-6 corresponding to a play function, the controller 180 can perform a play function of playing the $2^{nd}$ audio content.

Meanwhile, each of the functions described with reference to FIG. 5A through FIG. 5D may be executed through an input performed in a manner of applying a drag by maintaining a proximity touch. Such an embodiment is described in detail with reference to FIG. 6A through FIG. 6C as follows.

Figure 6A:
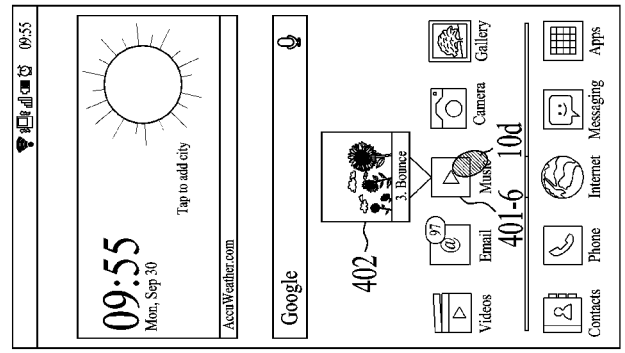
FIGS. 6A, 6B and 6C are diagrams for a controlling method of changing a play content through an input of a drag by maintaining a proximity touch according to one embodiment of the present invention.
Figure 6B:
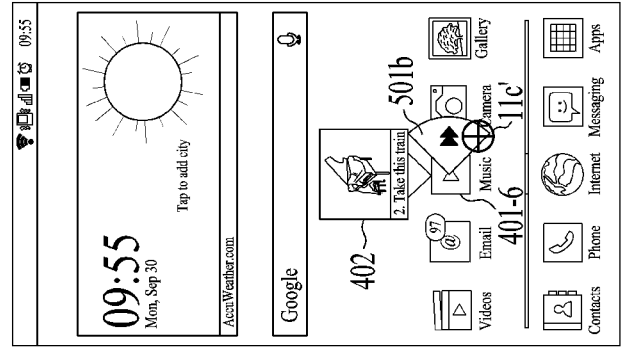
Figure 6C:
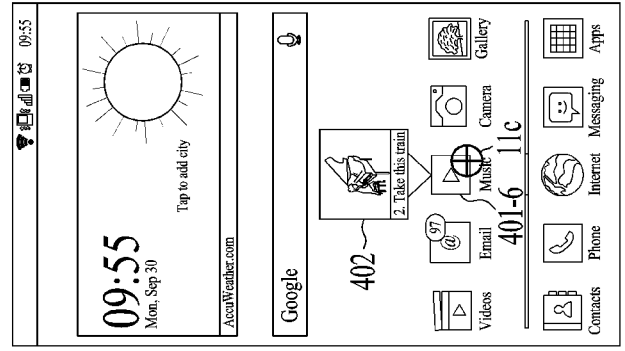

FIGS. 6A, 6B and 6C are diagrams for a controlling method of changing a play content through an input of a drag by maintaining a proximity touch according to one embodiment of the present invention.

Referring to FIG. 6A, the controller 180 currently outputs a $2^{nd}$ icon 401-6 by changing a $1^{st}$ icon 401-3 into the $2^{nd}$ icon 401-6 in response to a proximity touch input 11c. In doing so, if an input of applying a drag by maintaining the proximity touch input 11c is received, the controller 180 can output a function icon 501b. In this case, the function icon 501b is the same as described with reference to FIG. 5. In particular, the outputted function icon may be outputted to correspond to a dragged location. Like the example shown in FIG. 6A through FIG. 6C, if the dragged location in accordance with the input of applying the drag by maintaining the proximity touch input 11c is a location proximate to a right side of the $2^{nd}$ icon 401-6, the controller 180 can output the function icon 501b. On the other hand, if the dragged location in accordance with the input of applying the drag by maintaining the proximity touch input 11c is a location proximate to a left side of the $2^{nd}$ icon 401-6, the controller 180 can output a function icon 501a. In particular, a function icon of 'switch to a previous order content' can be outputted to a left location proximate to the $2^{nd}$ icon 401-6 and a function icon of 'switch to a next order content' can be outputted to a right location proximate to the $2^{nd}$ icon 401-6.

If a duration time of a proximity touch input 11c' to the function icon 501b reaches a $3^{rd}$ time, the controller 180 can switch a current play item to a $2^{nd}$ audio content from a $1^{st}$ audio content (i.e., execution of the function of the function icon 501b).

Referring to FIG. 6C, if a direct touch input 10d to the $2^{nd}$ icon 401-4 is received, as mentioned in the foregoing description, the controller 180 can play a $2^{nd}$ audio content that is a current play item.

Thus, according to the above embodiment described with reference to FIG. 6A through FIG. 6C, it is proposed for the controller 180 to output an additional icon in response to a duration time of a proximity touch input. In the following description, a controlling method for the controller 180 to use a swipe action of a proximity touch input according to another embodiment of the present invention is explained in detail with reference to FIGS. 7A, 7B and 7C.

FIGS. 7A, 7B and 7C are diagrams for a controlling method of changing an icon through a swipe action of a proximity touch input according to one embodiment of the present invention.

First of all, a swipe action of a proximity touch input may include an action performed in a manner of moving a proximity touch in a prescribed direction by maintaining the proximity touch and then releasing the proximity touch. The swipe action may differ from an input of a drag performed by maintaining proximity touch in speed. In particular, the swipe action is an action of moving a prescribed distance in a prescribed time in the course of maintaining a proximity touch, whereas the drag input may be an input of moving by maintaining a proximity touch irrespective of a time taken to move. And, the swipe action may be able to distinguish a function depending on a prescribed direction. For instance, a wipe action in a right direction may be set to correspond to a $1^{st}$ function, while a swipe action in a left direction may be set to correspond to a $2^{nd}$ function.

Referring to FIG. 7A, a play function is currently run through an audio play application. If the play function is operating, the controller 180 can change a $1^{st}$ icon 401-3 into a stop function icon 401-7 of the audio play application in response to a proximity touch input 11d. The reason for this is that the necessity for an icon corresponding to a play function is low because the play function is currently operating.

Referring to FIG. 7B, in response to a right swipe input 11e of the proximity touch input 11d, the controller 180 changes the stop function icon 401-7 into an icon 'switch to a next order content' 401-8 and is then able to output the icon 'switch to a next order content' 401-8.

If the icon 'switch to a next order content' 401-8 is selected, referring to FIG. 7C, the controller 180 can switch a currently played $1^{st}$ audio to a $2^{nd}$ audio content in next order.

According to the example to describe the above embodiment of the present invention so far, an audio play application has been considered only. A method of applying the above-described embodiment to a video play application according to an embodiment of the present invention is described in detail with reference to FIG. 8A through FIG. 8D as follows.

FIGS. 8A, 8B, 8C and 8D are diagrams for one example of applying a controlling method of changing an icon using a proximity touch to 'video play application' according to one embodiment of the present invention.

Referring to FIG. 8A, the controller 180 currently outputs a 1st icon 401-1. And, a proximity touch input 11e to the 1st icon 401-1 is currently received. In this case, the 1st icon 401-1 is a run icon of a video play application.

Referring to FIG. 8B, if a duration time of the proximity touch input 11e reaches a $1^{st}$ time, the controller 180 changes the $1^{st}$ icon 401-1 into a $2^{nd}$ icon 401-9 and is then able to output the $2^{nd}$ icon 401-9. As mentioned in the foregoing description, the controller 180 can output a preview screen 402.

The $2^{nd}$ icon 401-9 is an icon for a play function of the video play application. Referring to FIG. 8C, if a direct touch input 10f is applied to the $2^{nd}$ icon 401-9, the controller 180 can execute the play function on a prescribed video content set as a current play item.

Furthermore, according to one embodiment of the present invention, in outputting a play screen corresponding to the executed play function, it is proposed to distinguish the play function from a real running screen of an application. The reason for this is that the object of one embodiment of the present invention is to execute a function only by a simple method. Hence, referring to FIG. 8D, the controller 180 may output the play screen through a popup window 801 of the touchscreen 151.

Meanwhile, regarding specific applications, there exists an application of which use modes are classified into at least two or more types. In this case, according to one embodiment of the present invention, proposed is a controlling method of accessing a specific use mode effectively among a plurality of use modes using a proximity touch.

Figure 9A:
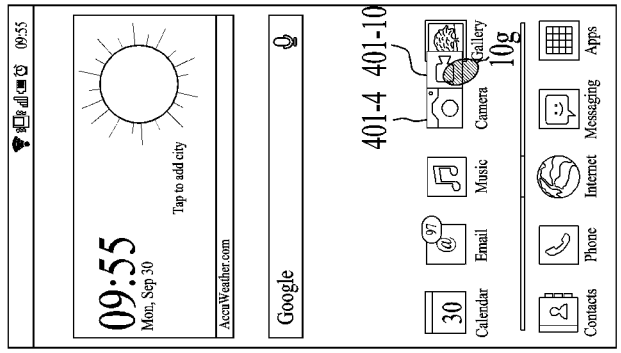
FIGS. 9A, 9B and 9C are diagrams for a controlling method of running an application by selecting a specific mode from a plurality of operational modes using a proximity touch according to one embodiment of the present invention.
Figure 9B:
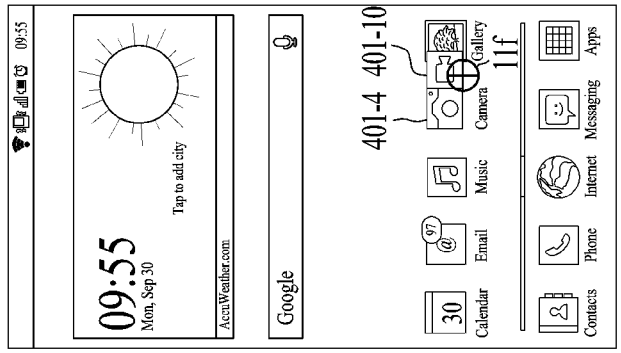
Figure 9C:
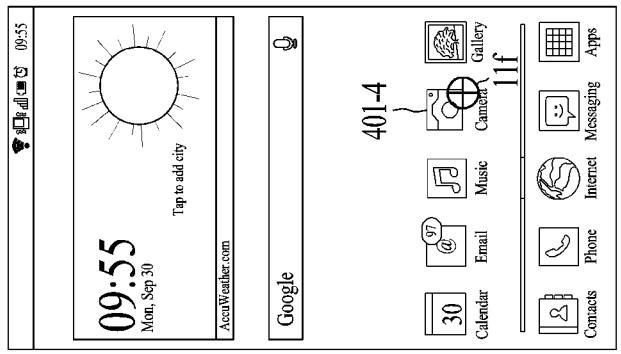

FIGS. 9A, 9B and 9C are diagrams for a controlling method of running an application by selecting a specific mode from a plurality of operational modes using a proximity touch according to one embodiment of the present invention.

Referring to FIG. 9A, the controller 180 currently outputs a $1^{st}$ icon 401-4 and receives a proximity touch input 11f to the $1^{st}$ icon 401-4. In this case, the $1^{st}$ icon 401-4 is an icon for running a prescribed application in $1^{st}$ mode.

If a duration time of the proximity touch input 11f reaches a $1^{st}$ time, the controller 180 output a $2^{nd}$ icon 401-10 to get closer to the $1^{st}$ icon 401-4. In this case, the $2^{nd}$ icon 401-1—may include an icon for running the prescribed application in $2^{nd}$ mode. According to the example shown in FIG. 9A through FIG. 9C, the $1^{st}$ icon 401-4 is an icon for a camera application run in mode for taking a photo. And, the $2^{nd}$ icon 401-1—may include an icon for the camera application run in mode for making a video.

In particular, according to one embodiment of the present invention, it is proposed to enable a user to make a function selection in a simple manner of outputting icons corresponding to various modes using a proximity touch before running a camera application and then running the application using a mode selected through the outputted icons.

Referring to FIG. 9C, if a direct touch input 10g to the $2^{nd}$ icon 401-10 is received, the controller 180 runs the camera application in the $2^{nd}$ mode.

Figure 10A:
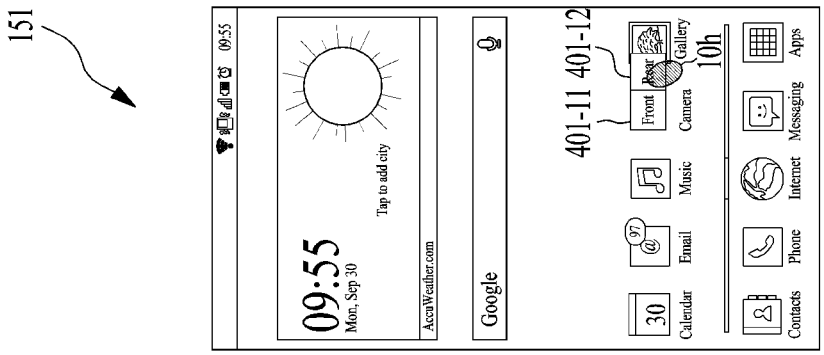
FIGS. 10A, 10B and 10C show another example of the above embodiment described with reference to FIG. 9A through FIG. 9C.
Figure 10B:
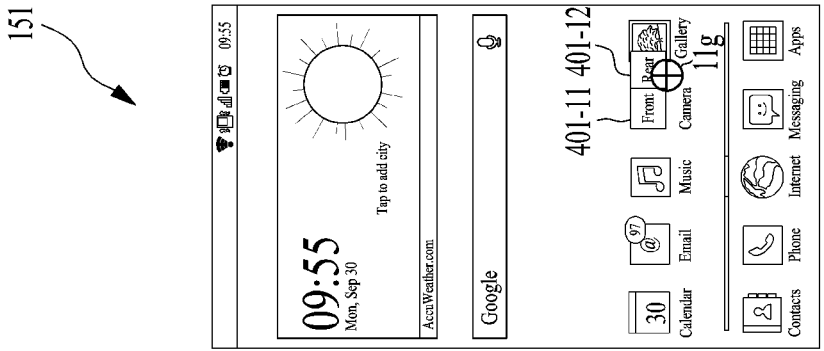
Figure 10C:
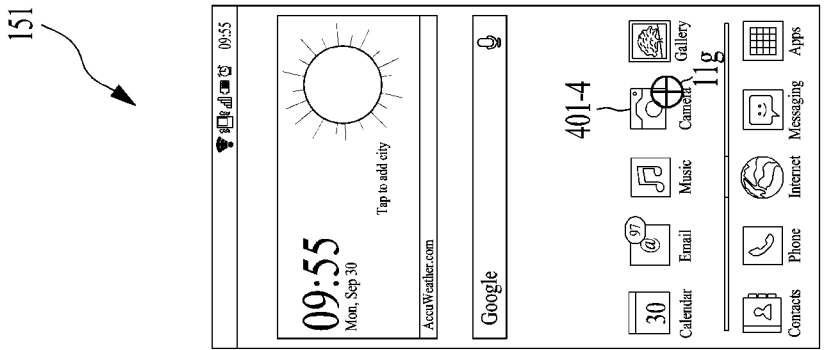

FIGS. 10A, 10B and 10C show another example of the above embodiment described with reference to FIG. 9A through FIG. 9C.

Referring to FIG. 10A, the controller 180 currently outputs a $1^{st}$ icon 401-4 and receives a proximity touch input 11g to the $1^{st}$ icon 401-4. In this case, the $1^{st}$ icon 401-4 is an icon for running a prescribed application.

If a duration time of the proximity touch input 11g reaches a $1^{st}$ time, the controller 180 changes the $1^{st}$ icon 401-4 into a $2^{nd}$ icon 401-11 and also outputs a $3^{rd}$ icon 401-12 to get closer to the $2^{nd}$ icon 401-11. In this case, the $2^{nd}$ icon 401-11 may be an icon for running the prescribed application in $1^{st}$ mode and the $3^{rd}$ icon 401-12 may be an icon for running the prescribed application in $2^{nd}$ mode. According to the example shown in FIG. 10A through FIG. 10C, the $1^{st}$ icon 401-4 is an icon for a camera application. And, the $2^{nd}$ icon may be an icon for the camera application that can be run in front mode that uses the front camera 121a. Moreover, the $3^{rd}$ icon 401-12 may be an icon for the camera application that can be run in rear mode that uses the rear camera 121b.

Referring to FIG. 10C, if a direct touch input 10h to the $3^{rd}$ icon 401-12 is received, the controller 180 runs the camera application in the rear mode.

Meanwhile, according to the embodiments described with reference to FIG. 9A through FIG. 9C and FIG. 10A through FIG. 10C, a plurality of icons respectively corresponding to a plurality of modes are outputted. In the following description, an embodiment for changing a running mode by outputting a lever to an icon and then changing a location of the lever is explained in detail with reference to FIG. 11.

Figure 11A:
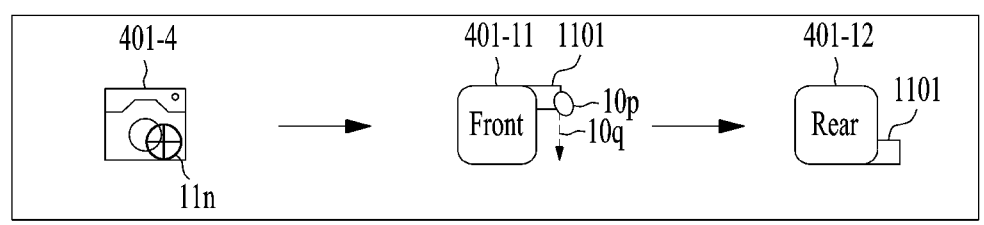
FIGS. 11A, 11B and 11C are diagrams for a controlling method of changing a running mode by changing a location of a lever outputted to an icon according to one embodiment of the present invention.
Figure 11B:
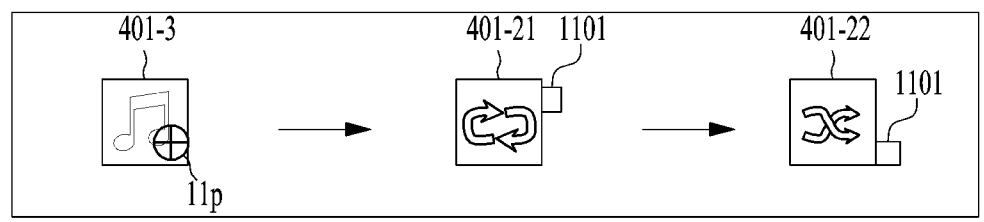
Figure 11C:
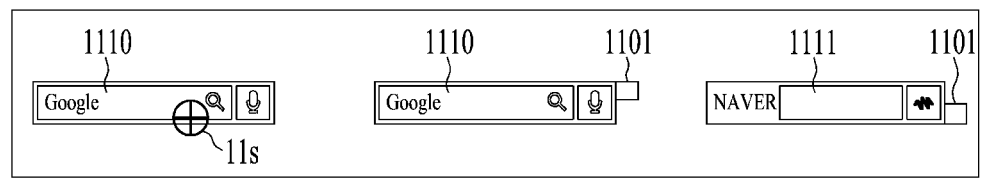

FIGS. 11A, 11B and 11C are diagrams for a controlling method of changing a running mode by changing a location of a lever outputted to an icon according to one embodiment of the present invention.

FIG. 11A shows a configuration of an output of a $1^{st}$ icon 401-4 for running a camera application, in which other configurations of the touchscreen 151 are omitted.

Referring to FIG. 11A, the controller 180 receives a proximity touch input 11n to the $1^{st}$ icon 401-4. If a duration time of the proximity touch input 11n reaches a 1st time, the controller 180 changes the $1^{st}$ icon 401-4 into a $2^{nd}$ icon 401-11. In this case, the $2^{nd}$ icon 401-11 is an icon for running the camera application in front mode. And, the controller 180 outputs a lever object 1101 together with the $2^{nd}$ icon 401-11. In this case, the lever object 1101 may be used for a user to select a running mode of an application. If an input of changing a location of the lever object 1101 into a $2^{nd}$ location from a $1^{st}$ location is received, the controller 180 can change the $2^{nd}$ icon 401-11 into a $3^{rd}$ icon

401-12. In this case, the 3$^{rd}$ icon 401-12 is an icon for running the camera application in rear mode. For instance, the input of changing the location of the lever object 1101 into the 2$^{nd}$ location from the 1$^{st}$ location may include an input of applying a touch 10p to the lever object 1101 and then performing a drag 10q.

FIG. 11B shows a configuration of an output of a 1$^{st}$ icon 401-3 for running an audio play application, in which other configurations of the touchscreen 151 are omitted.

Referring to FIG. 11B, the controller 180 receives a proximity touch input 11p to the 1$^{st}$ icon 401-3. If a duration time of the proximity touch input 11p reaches a 1$^{st}$ time, the controller 180 changes the 1$^{st}$ icon 401-3 into a 2$^{nd}$ icon 401-21. In this case, the 2$^{nd}$ icon 401-21 is an icon for running the audio play application in mode play in order'. And, the controller 180 outputs a lever object 1101 together with the 2$^{nd}$ icon 401-21. If an input of changing a location of the lever object 1101 into a 2$^{nd}$ location from a 1$^{st}$ location is received, the controller 180 can change the 2$^{nd}$ icon 401-21 into a 3$^{rd}$ icon 401-22. In this case, the 3$^{rd}$ icon 401-22 is an icon for running the audio play application in mode 'play randomly'.

The above-mentioned running mode may be applicable to a search widget. FIG. 11C is a diagram for a configuration of an output of a 1$^{st}$ search widget 1110 for performing a search using a 1$^{st}$ search engine.

Referring to FIG. 11C, the controller 180 receives a proximity touch input 11s on the 1$^{st}$ search widget 1110. If a duration time of the proximity touch input 11s reaches a 1$^{st}$ time, the controller 180 can output a lever object 1101. If an input of changing a location of the lever object 1101 into a 2$^{nd}$ location from a 1$^{st}$ location is received, the controller 180 changes the outputted 1$^{st}$ search widget 1110 into a 2$^{nd}$ search widget 1111 and is then able to output the 2$^{nd}$ search widget 1111. In this case, the 2$^{nd}$ search widget 111 is a widget for performing a search using a 2$^{nd}$ search engine.

Meanwhile, the embodiment of the present invention using the above-described proximity touch can be extended to a call application. Such an embodiment is described in detail with reference to FIG. 12A through FIG. 12C as follows.

FIGS. 12A, 12B and 12C are diagrams for a controlling method of running a prescribed function of a call application using a proximity touch according to one embodiment of the present invention.

Referring to FIG. 12A, the controller 180 currently outputs a 1$^{st}$ icon 401-13 for running a call application. If a duration time of a proximity touch input 11h to the 1st icon 401-13 reaches a 1$^{st}$ time, the controller 180 can change the 1$^{st}$ icon 401-13 into a 2$^{nd}$ icon 401-14. The 2$^{nd}$ icon 401-14 corresponds to a function of sending a call signal to a prescribed counterpart using a call application. And, the controller 180 can output a preview screen 402 for the prescribed counterpart. In this case, the preview screen 402 may include an image saved in a contact information of the prescribed counterpart.

Moreover, the controller 180 can further output function icons 501a and 501b configured to switch counterparts in sequence together with the 2$^{nd}$ icon 401-14.

Subsequently, if the function icon 501b for switching to a next counterpart is selected, the controller 180 switches a call counterpart to a next order counterpart and is then able to output a preview screen 402 for the switched counterpart.

Referring to FIG. 12C, if a direct touch input 10j to the 2$^{nd}$ icon 401-14 is received, the controller 180 can send a call signal by setting the call counterpart to the switched counterpart.

Meanwhile, there may exist various functions runnable on a prescribed counterpart saved in contacts. A method of facilitating an access to such a function according to an embodiment of the present invention is described in detail with reference to FIG. 13A through FIG. 13C as follows.

Figure 13A:
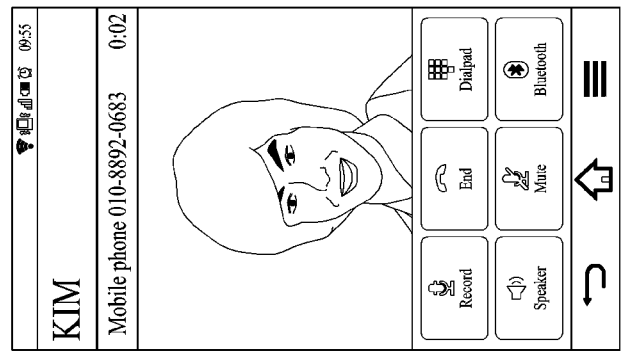
FIGS. 13A, 13B and 13C are diagrams for a controlling method of providing various functions for a prescribed counterpart in contacts using a proximity touch according to one embodiment of the present invention.
Figure 13B:
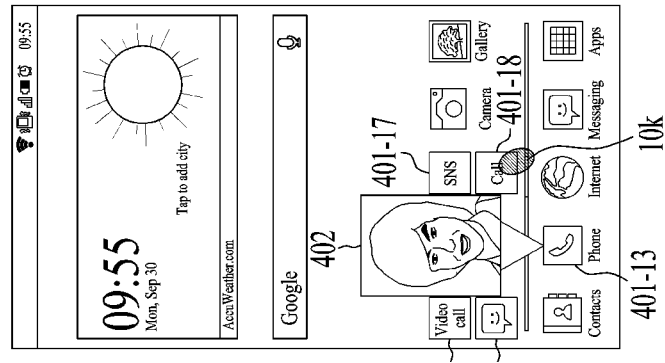
Figure 13C:
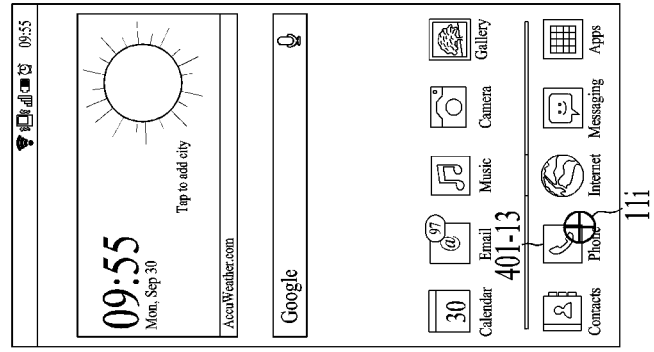

FIGS. 13A, 13B and 13C are diagrams for a controlling method of providing various functions for a prescribed counterpart in contacts using a proximity touch according to one embodiment of the present invention.

Referring to FIG. 13A, the controller 180 currently outputs a 1$^{st}$ icon 401-13. And, a proximity touch input 11i is currently received on the 1$^{st}$ icon 401-14. If a duration time of the proximity touch input 11j reaches a 1$^{st}$ time, the controller 180 can output function icons 401-15 to 401-18 of functions that can be performed on a prescribed counterpart in contacts.

Referring to FIG. 13B, the function icon 401-15 is an icon corresponding to a video call send function that targets a prescribed counterpart. The function icon 401-16 corresponds to a text message send function that targets a prescribed counterpart. The function icon 401-17 corresponds to an SNS (social network service) execute function that targets a prescribed counterpart. And, the function icon 401-18 corresponds to a call signal send function that targets a prescribed counterpart.

Referring to FIG. 13C, if a direct touch input 10k to the function icon 401-18 is received in FIG. 13B, the controller 180 can send a call signal that targets the prescribed counterpart.

Meanwhile, a proximity touch is available for a photographing in another embodiment of the present invention. Such an embodiment is described in detail with reference to FIG. 14A through FIG. 14C as follows.

Figure 14A:
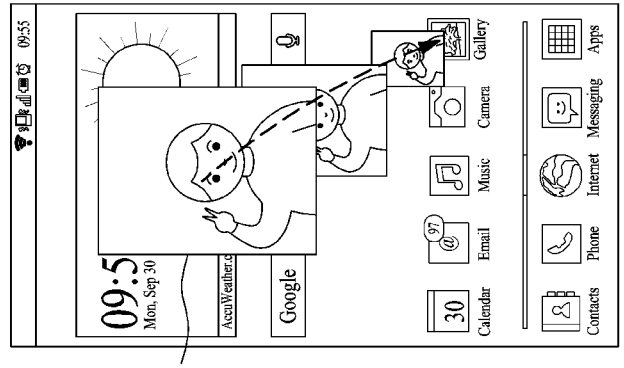
FIGS. 14A, 14B and 14C are diagrams for a controlling method of taking a photo easily using a proximity touch according to one embodiment of the present invention.
Figure 14B:
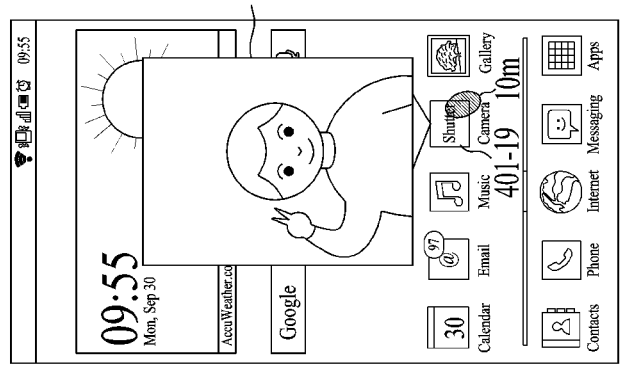
Figure 14C:
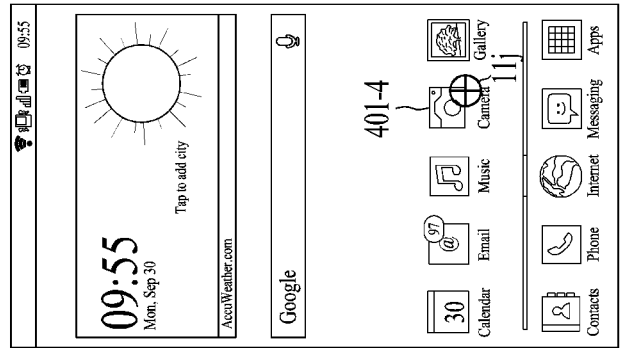

FIGS. 14A, 14B and 14C are diagrams for a controlling method of taking a photo easily using a proximity touch according to one embodiment of the present invention.

Referring to FIG. 14A, the controller 180 outputs a 1$^{st}$ icon 401-4 for running a camera application. After a proximity touch input 11j has been applied to the 1$^{st}$ icon 401-4, if a duration time of the proximity touch input 11j reaches a 1$^{st}$ time, the controller 180 activates the camera 121a/121b and is then able to output a preview screen 402 of the activated camera 121a/121b [cf. FIG. 14B]. Subsequently, the controller 180 changes the 1$^{st}$ icon 401-4 into a 2$^{nd}$ icon 401-19 and is then able to output the 2$^{nd}$ icon 401-19. In this case, the 2$^{nd}$ icon 401-19 may include an icon corresponding to a photographing function of the camera application.

Referring to FIG. 14B, if a direct touch input 10m is applied to the 2$^{nd}$ icon 401-19, the controller 180 takes a photo using the activated camera 121a/121b and is then able to save the taken photo. In doing so, referring to FIG. 14C, the controller 180 can output an animation effect 1301 as if the saved photo enters an icon of a gallery application.

Meanwhile, the above-mentioned proximity touch function can be further utilized if a notification to a user exists. Such an embodiment is described in detail with reference to FIG. 15A, FIG. 15B, FIG. 16A, FIG. 16B, FIG. 16C and FIG. 16D as follows.

FIGS. 15A, 15B, 16A, 16B, 16C and 16D are diagrams for a controlling method of providing a preview of an alarm in response to a proximity touch input received on an application having the alarm exist therein to be provided to a user according to one embodiment of the present invention.

Referring to FIG. 15A, the controller 180 currently outputs a 1$^{st}$ icon 401-2 for running an email application. After a proximity touch input 11k has been applied to the 1$^{st}$ icon 401-2, if a duration time of the proximity touch input 11$k$ reaches a 1$^{st}$ time, referring to FIG. 15B, the controller 180 can output a preview screen 402 of an alarm provided to a user through the email application. In this case, the alarm may include a reception of an email in case of the email application, by which type of applications and alarms are non-limited.

Embodiment for an existence of an alarm for a call application is described in detail with reference to FIG. 16A, FIG. 16B, FIG. 16C and FIG. 16D as follows.

Referring to FIG. 16A, the controller 180 currently outputs a 1$^{st}$ icon 401-13 for running a call application and also receives a proximity touch input 11$m$ through the 1st icon 401-13. If a duration time of the proximity touch input 11$m$ reaches a 1$^{st}$ time, the controller 180 can output a 1$^{st}$ preview screen 402-1 of an alarm provided to a user through the call application. In this case, referring to FIG. 16B, the 1$^{st}$ preview screen 402-1 may include a list of missed call counterparts.

Moreover, if a duration time of the proximity touch input 11$m$ reaches a 2$^{nd}$ time, the controller 180 can output a 2$^{nd}$ preview screen 402-2 of an alarm provided to a user through the call application. In this case, the 2$^{nd}$ preview screen 402-2 may include contact information on a prescribed one of missed call counterparts. In particular, the contact information may include a phone number information of a specific counterpart, an image information of a specific counterpart and the like. Moreover, as the proximity touch input 11$m$ is further maintained, the controller 180 can sequentially provide a contact information on each of a plurality of the missed call counterparts.

While the controller 180 outputs the 2$^{nd}$ preview screen 402-2, the controller 180 changes the 1$^{st}$ icon 401-13 into a 2$^{nd}$ icon 401-14 and is then able to output the 2$^{nd}$ icon 401-14. In this case, the 2$^{nd}$ icon 401-14 corresponds to a function of sending a call signal to a prescribed counterpart using the call application.

Referring to FIG. 16C, in response to a direct touch input 10$n$ applied to the 2$^{nd}$ icon 401-14, the controller 180 can send a call signal to a prescribed counterpart [cf. FIG. 16D].

Meanwhile, according to one embodiment of the present invention, assume that two icons differing from each other in size exist on a home screen. In case of a proximity touch applied to the icon in larger size, buttons of various functions can be outputted. Such an embodiment is described in detail with reference to FIG. 17A through FIG. 17C as follows.

Figure 17A:
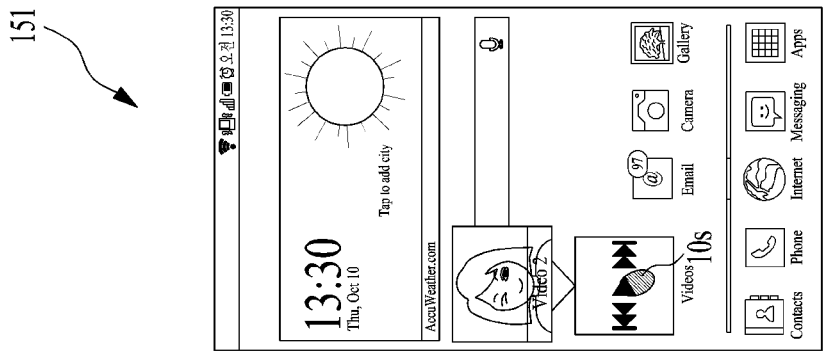
FIGS. 17A, 17B and 17C are diagrams for a controlling method of facilitating an access to an oversize icon using a proximity touch according to one embodiment of the present invention.
Figure 17B:
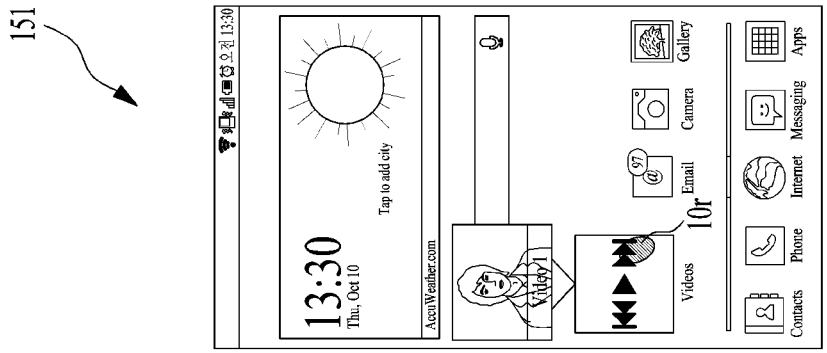
Figure 17C:
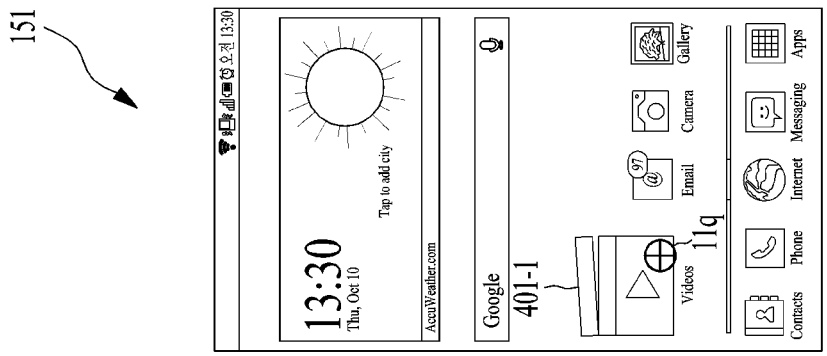

FIGS. 17A, 17B and 17C are diagrams for a controlling method of facilitating an access to an oversize icon using a proximity touch according to one embodiment of the present invention.

Referring to FIG. 17A, the controller 180 outputs a 1$^{st}$ icon 401-1 in relatively large size and receives a proximity touch input 11$q$ to the 1$^{st}$ icon 401-1. In this case, the 1$^{st}$ icon 401-1 is an icon for running a video play application.

If a duration time of the proximity touch input 11$q$ reaches a 1$^{st}$ time, the controller 180 outputs 2$^{nd}$ to 4$^{th}$ icons within a region in which the 1$^{st}$ icon 401-1 is outputted. In this case, the 2$^{nd}$ to 4$^{th}$ icons correspond to functions of the video play application, respectively.

Referring to FIG. 17B, the controller 180 can output a preview screen 402 corresponding to a 1$^{st}$ video content that corresponds to a current play item.

If an input 10$r$ of selecting the icon corresponding to a function 'switch to a next order content' from the 2$^{nd}$ to 4$^{th}$ icons is received, the controller 180 can switch the 1$^{st}$ video content, which is the current play item, to a 2$^{nd}$ video content in next order. Subsequently, referring to FIG. 17C, the controller 180 changes the preview screen 402 into a preview screen for the 2$^{nd}$ video content and is then able to output the preview screen for the 2$^{nd}$ video item. If an input 10$s$ of selecting the icon corresponding to a play function from the 2$^{nd}$ to 4$^{th}$ icons is received, the controller 180 can play the 2$^{nd}$ video content that is a current play item.

Meanwhile, according to one embodiment of the present invention, it is able to facilitate a photo reading using the proximity touch. Such an embodiment is described in detail with reference to FIG. 18 as follows.

FIGS. 18A, 18B and 18C are diagrams for a controlling method of facilitating a photo reading using a proximity touch according to one embodiment of the present invention.

Referring to FIG. 18A, the controller 180 displays a running state diagram of a gallery application for reading photos. According to the example shown in FIG. 18A, the gallery application provides thumbnail image of photos in a manner of sorting and arranging the thumbnail images per year.

Since each of the thumbnail images has a relatively small size, it may be difficult for a user to read the thumbnail images. Hence, according to one embodiment of the present invention, it is proposed to solve such a problem using a proximity touch.

After a proximity touch 11$r$ has been applied to a specific thumbnail image, if a duration time of the proximity touch input 11$r$ reaches a 1$^{st}$ time, referring to FIG. 18B, the controller 180 can output a preview popup window 1801 for a specific image 1802$a$ corresponding to the specific thumbnail image and at least one or more images 1802$b$, 1802$c$ . . . associated with the specific image 1802$a$. In this case, the associated image may include a photo taken on the same date of the specific image (or a date adjacent to the same date) and/or a photo taken in the same place (or a place adjacent to the same place) of the specific image.

Moreover, according to one embodiment of the present invention, it is proposed to output a slide play icon 1803 capable of outputting the specific image 1802 and the at least one or more associated images 1802$b$, 1802$c$ . . . together in a slide show [FIG. 18B].

If an input 10$t$ of selecting the slide play icon 1803 is received, referring to FIG. 18C, the controller 180 can run the slide show in a manner of sequentially outputting the specific image 1802 and the at least one or more associated images 1802$b$, 1802$c$.

Accordingly, embodiments of the present invention provide various effects and/or features.

According to at least one of embodiments of the present invention, it is able to provide a controlling method for enhancing convenience and intuitiveness by a controlling method using a proximity touch received through a touchscreen.

It will be apparent to those skilled in the art that the present invention can be specified into other form(s) without departing from the spirit or scope of the inventions.

The above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen configured to receive an input of a proximity touch or a direct touch, wherein the proximity touch is inputted when a touch object is located within a predetermined distance from the touchscreen without being in direct contact with the touchscreen, and wherein the direct touch is inputted when the touch object is in direct contact with the touchscreen; and
a controller configured to:
cause the touchscreen to display a first icon;
detect an input of at least one of a proximity touch or a direct touch received via the touchscreen with respect to the first icon;
cause the touchscreen to terminate the displaying of the first icon, display a second icon at a same general location of the touchscreen as the first icon, and display a first preview screen of an application associated with the first icon when the proximity touch with respect to the first icon is detected for a first threshold time;
execute the application associated with the first icon and display an execution screen of the executed application when the direct touch with respect to the first icon is detected;
execute the application associated with the first icon and perform a function of the executed application without displaying the execution screen of the executed application when a direct touch with respect to the second icon is detected,
wherein the second icon indicates the function of the executed application associated with the first icon,
wherein the application comprises a call application or a contact search application,
wherein the function performed in response to the direct touch with respect to the second icon comprises sending a call signal to a prescribed counterpart using the call application,
wherein the prescribed counterpart includes one of missed call counterparts, and
wherein the first preview screen comprises a first image included in contact information of the prescribed counterpart;
cause the touchscreen to display a second preview screen of the application associated with the first icon when the proximity touch with respect to the first icon is detected for a second threshold time, and
wherein the second preview screen comprises contact information of the one of missed call counterparts.

2. The mobile terminal of claim 1, wherein the controller is further configured to cause the touchscreen to:
display a function icon in addition to the second icon when the proximity touch with respect to the first icon is detected for the first threshold time; and
display the first preview screen comprising a second image corresponding to a next counterpart in response to an input received via the function icon.

3. The mobile terminal of claim 1, wherein the first preview screen is no longer displayed when the second preview screen is displayed.

4. A method for controlling a mobile terminal, the method comprising:
displaying a first icon on a touchscreen configured to receive an input of a proximity touch or a direct touch, wherein the proximity touch is inputted when a touch object is located within a predetermined distance from the touchscreen without being in direct contact with the touchscreen, and wherein the direct touch is inputted when the touch object is in direct contact with the touchscreen;
detecting an input at least one of a proximity touch or a direct touch received via the touchscreen with respect to the first icon;
terminating the displaying of the first icon, displaying a second icon at a same general location of the touchscreen as the first icon, and displaying a first preview screen of an application associated with the first icon when the proximity touch with respect to the first icon is detected for a first threshold time;
executing the application associated with the first icon and displaying an execution screen of the executed application when the direct touch with respect to the first icon is detected;
executing the application associated with the first icon and performing a function of the executed application without displaying the execution screen of the executed application when a direct touch with respect to the second icon is detected,
wherein the second icon indicates the function of the executed application associated with the first icon,
wherein the application comprises a call application or a contact search application,
wherein the function performed in response to the direct touch with respect to the second icon comprises sending a call signal to a prescribed counterpart using the call application,
wherein the prescribed counterpart includes one of missed call counterparts, and
wherein the first preview screen comprises a first image included in contact information of the prescribed counterpart; and
displaying a second preview screen of the application associated with the first icon when the proximity touch with respect to the first icon is detected for a second threshold time, and
wherein the second preview screen comprises contact information of the one of missed call counterparts.

5. The method of claim 4, further comprising:
displaying a function icon in addition to the second icon when the proximity touch with respect to the first icon is detected for the first threshold time; and
displaying the first preview screen comprising a second image corresponding to a next counterpart in response to an input received via the function icon.

6. The method of claim 4, wherein the first preview screen is no longer displayed when the second preview screen is displayed.

* * * * *